United States Patent Office 3,385,129
Patented May 28, 1968

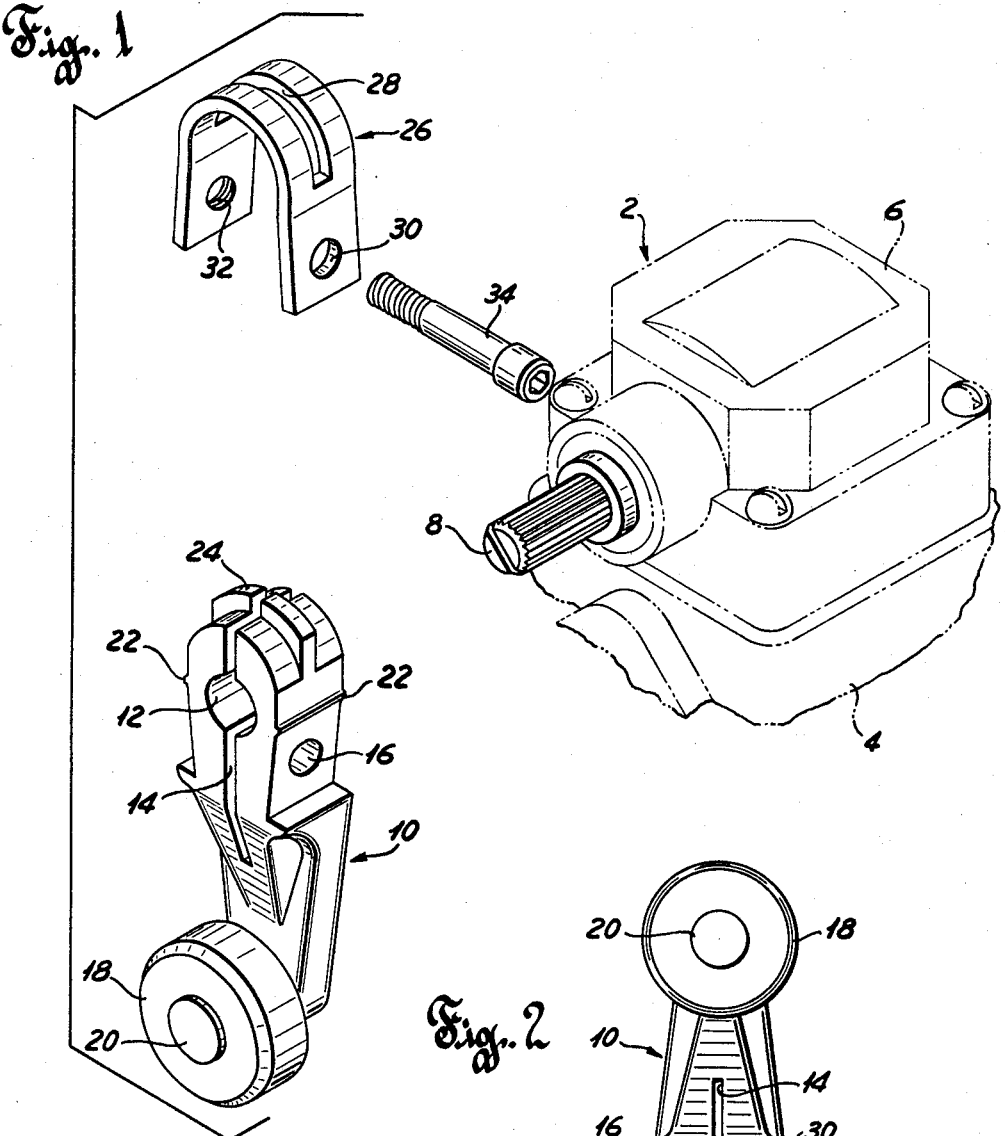
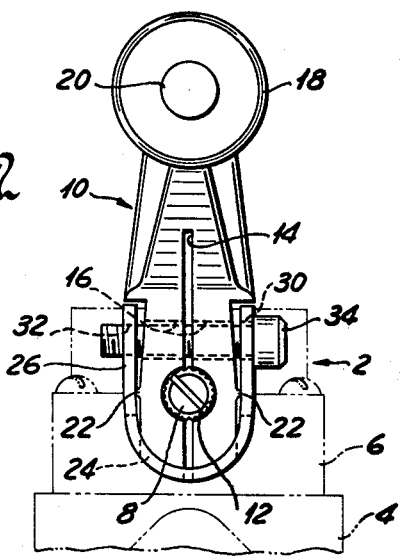
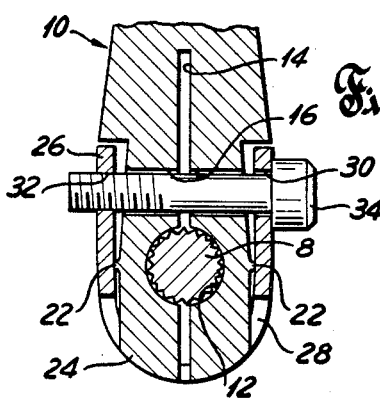

3,385,129
MEANS FOR MOUNTING A LEVER TO A ROTATABLE SHAFT
Eugene F. Duncan and Carl E. Sauers, Milwaukee, Wis., assignors to Cutler-Hammer, Inc., Milwaukee, Wis., a corporation of Delaware
Filed July 7, 1966, Ser. No. 563,429
6 Claims. (Cl. 74—545)

ABSTRACT OF THE DISCLOSURE

A reversible, hardened steel clamp surrounds the split end of a lever operator. A clamping screw passes transversely through the clamp and lever on the "free-end" side of the shaft opening to take into a threaded hole in one leg of the clamp. Clamping pressure is applied by drawing the ends of the clamp together with the screw, the pressure being localized to the plane of the transverse centerline of the shaft by lateral ribs on the lever and bends formed on the clamp legs.

---

This invention relates to an improved means for mounting a lever to a rotatable shaft. More particularly it relates to improved means for mounting lever operators to rotatable shafts of electric switches such as limit switches.

Limit switch operating levers are usually die cast of a lightweight material such as aluminum or the like and a common means for mounting them to the switch shaft has been to provide the mounting end of the lever with a slotted hole and a transverse hole in the portion of that end protruding beyond the shaft. The portion of the transverse hole on one side of the slot is provided with threads to receive a screw so that the end may be drawn together to clamp the lever around the shaft. Excessive tightening has in some instances caused the lever to be permanently bent around the shaft and therefor not release the shaft upon loosening of the screw, and in other instances has caused the threads of the hole to become damaged. In either case a new lever is required.

Another disadvantage of this type of construction is the length of the lever extending beyond the shaft at the mounting end, this length being necessitated to house the clamping screw. In certain switch locations this length is undesirable because overhanging or extending machine parts interfere with that end of the lever. Another disadvantage found when the switch was mounted in certain locations was that the clamping screw head was inaccessible due to machinery parts. Since the hole in the lever was only threaded on one side, it was impossible to insert the screw from the other side of the lever, and the switch had to be completely removed to make any radial adjustments to the lever.

It is therefore an object of this invention to provide an improved means of mounting a lever to a rotatable shaft wherein excess clamping pressure will not damage the lever.

It is another object of this invention to provide an improved means of mounting a lever to a rotatable shaft wherein the length of the lever extending beyond the shaft at the mounting end is reduced to allow the switch to be mounted closer to extending machinery surfaces.

It is still another object of this invention to provide an improved means of mounting a lever to a rotatable shaft wherein the clamping screw may be accessible from either side of the lever.

These and other objects will be more fully understood in the following specification and claims, when read in conjunction with the drawings, wherein:

FIGURE 1 is an exploded isometric view of the various parts comprising the invention;

FIG. 2 is a front elevational view of the assembled parts of FIG. 1; and

FIG. 3 is a sectional view of a portion of FIG. 2.

Referring specifically to FIG. 1, the housing of a limit switch 2 is shown in broken lines and the operating shaft of the switch is shown in full lines. Limit switch 2 is of a well known type wherein a small precision switch is mounted within a molded base portion 4 having an operating head 6 mounted at one end thereof. The operating head 6 has a shaft 8 extending outwardly of one side and may be mounted upon the base in any one of four positions so that the shaft 8 may extend to the front, rear or either side of the base. A camming mechanism is contained within head 6 whereby rotary movement of shaft 8 affects linear movement of a plunger into the base 4 to actuate the switch therein.

A die cast operating lever 10 is provided at one end with a hole 12 to receive the shaft 8 of limit switch 2 and a "saw" slot 14 extending along the longitudinal centerline of the lever to split that end of the lever and axially bisect the hole 12. Slot 14 extends beyond the hole 12 for approximately one-half the length of the lever 10. A second hole 16 is formed in the lever transversely to the slot 14 at a point between the first mentioned hole 12 and the closed end of the slot 14. The opposite end of the lever is provided with a freely rotatable roller 18 secured thereto by a rivet 20.

A pair of lateral ribs 22 are molded on the lever on the plane of the transverse centerline of hole 12. These ribs are machined down in a separate operation upon the lever and become nearly flush with the sides of the lever, the distance across the ribs being held to a close dimensional tolerance for reasons that will become apparent later. An upstanding rib 24 is formed on the transverse centerline of the slotted end of the lever and serves to position a U-shaped clamp member 26 upon the end of the lever 10.

The clamp 26, made of a hardened spring steel, has a slot 28 formed in it bight portion corresponding to the rib 24 of lever 10. Clamp 26 is placed over the mounting end of lever 10 with the rib 24 extending into the slot 28 and the legs of the clamp extending along the sides of the lever and over the ribs 22. The legs of clamp 26 have alined holes 30 and 32 formed therein which are also in substantial alinement with hole 16 of lever 10. Hole 32 is threaded to receive a screw 34 while holes 30 and 16 are somewhat larger to provide clearance for the shank of screw 34. The legs of clamp 26 are bent outwardly a small amount, the origin of the bends falling on the plane of the transverse centerline of the hole 12 and corresponding to the ribs 22. The sides of lever 10 are provided with cooperating reverse angles originating at the same plane and substantially equal to the clamp leg angles. This is done to provide more clamping movement for the legs without prebending the legs to such an angle wherein it would be difficult to thread the screw 34 into the hole 32. The distance between the legs of the clamp at the origin of the bends is also held to a close tolerance so that there is only a small amount of clearance between the clamp and lever at this point.

Lever 10 with clamp 26 and screw 34 loosely assembled thereto, may be placed on the shaft 8 of limit switch 2 and rotatably adjusted to any desired radial position of the 360° circle. Upon establishing the final position the clamp is tightened by turning the screw 34 which draws the legs of clamp 26 together which in turn exert a clamping pressure on the slotted halves of the lever 10 about the shaft 8. It may be seen that a certain amount of localized pressure is exerted upon the transverse centerline of shaft 8 in opposite directions due to the slight projections of ribs 22 and the bend origins of the legs of clamp 26 which lie on that plane and therefore excessive turning of the screw 34 will not tend to bend the slotted halves of the lever around the shaft 8. Furthermore, if the screw 34 is turned an excessive amount to a point where the thread joint is damaged, the damage will occur on the screw itself because of the strong material used in clamp 26. Screw 34 is a standard hardware item and may easily be replaced.

With the clamping screw 34 located between the operator end of the lever 10 and the shaft 8, the portion of the lever of the mounting end extending beyond the shaft 8 may be reduced to a minimal amount. This is accomplished by rounding that portion of the lever on a radius which is substantially concentric with the shaft 8. Since this end of the lever is symmetrical about the slot 14, the clamp 26 may be inserted upon the lever with threaded hole 32 on either side of the lever, thus allowing the head of screw 34 to be accessible from either side as desired.

While the invention herein disclosed has been illustrated and described as particularly advantageous to the lever operator of a limit switch, it should be seen that the same may be used equally as well with other devices, and the description herein is not intended to limit the scope of the appended claims.

We claim:

1. A lever assembly for adjustable attachment on a shaft, in combination, a lever having a longitudinal slot extending through one end, a first opening bisected by said slot and adapted to receive a shaft, and having a second opening with its axis at a right angle to the axis of said first opening, a substantially U-shaped clamp fitting about the slotted end of said lever and having openings in the legs thereof alined with said second opening in said lever, and a screw having a head engaging one clamp leg and extending through one clamp opening and said second opening of said lever and threadably engaging with the other opening in said clamp to afford, in one direction of rotation of said screw, drawing together of the clamp legs to compress said lever about a shaft on which it is mounted.

2. The combination according to claim 1, wherein said second opening is located at a plane between said first opening and the closed end of said slot.

3. The combination according to claim 2, together with mutually engageable portions formed on said lever and said clamp to position the latter upon the lever.

4. The combination according to claim 3, wherein said mutually engageable portions comprise an upstanding portion formed on the slotted end of said lever and a corresponding opening formed in said clamp.

5. The combination according to claim 2, wherein said leg portions are bent outwardly of said lever at a point on the same plane as the transverse centerline of said first opening.

6. The combination according to claim 5, together with lateral protrusions on said lever substantially on the same plane as the transverse centerline of said first opening and said protrusions are engageable by the legs of said clamp member.

References Cited

UNITED STATES PATENTS

| 798,505 | 8/1905 | Gordon | 287—52.02 |
| 1,787,017 | 12/1930 | Paul | 287—52.02 |
| 1,644,261 | 10/1927 | Marles. | |

FOREIGN PATENTS

| 56,317 | 5/1944 | Netherlands. |

FRED C. MATTERN, Jr., *Primary Examiner.*

J. S. CORNETTE, *Assistant Examiner.*